(12) United States Patent
Dhamankar et al.

(10) Patent No.: US 7,765,361 B2
(45) Date of Patent: Jul. 27, 2010

(54) ENFORCED TRANSACTION SYSTEM RECOVERABILITY ON MEDIA WITHOUT WRITE-THROUGH

(75) Inventors: Robin Dhananjay Dhamankar, Redmond, WA (US); Vishal Kathuria, Woodinville, WA (US); Sethu Kalavakur, Redmond, WA (US); Gayathri Venkataraman, Redmond, WA (US); Avraham Levy, Seattle, WA (US); Hanumantha Rao Kodavalla, Sammamish, WA (US); Chunjia Li, Issaquah, WA (US); Eric Ray Christensen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 11/562,053

(22) Filed: Nov. 21, 2006

(65) Prior Publication Data

US 2008/0120470 A1    May 22, 2008

(51) Int. Cl.
*G06F 12/16* (2006.01)
(52) U.S. Cl. ........................ 711/135; 711/113
(58) Field of Classification Search ................ 711/113, 711/135
See application file for complete search history.

(56) References Cited

U.S. PATENT DOCUMENTS

| | | | |
|---|---|---|---|
| 5,797,022 A * | 8/1998 | Shimotono et al. | 713/323 |
| 6,055,604 A * | 4/2000 | Voigt et al. | 711/117 |
| 6,173,292 B1 | 1/2001 | Barber et al. | |
| 6,449,623 B1 | 9/2002 | Bohannon et al. | |
| 6,557,082 B1 | 4/2003 | Josten et al. | |
| 6,631,385 B2 | 10/2003 | Lee et al. | |
| 6,678,809 B1 | 1/2004 | Delaney et al. | |
| 6,732,124 B1 | 5/2004 | Koseki et al. | |
| 6,928,518 B2 | 8/2005 | Talagala | |
| 6,978,279 B1 | 12/2005 | Lomet et al. | |
| 7,165,129 B1 * | 1/2007 | Okmianski et al. | 710/52 |
| 2002/0116404 A1 * | 8/2002 | Cha et al. | 707/202 |
| 2004/0267835 A1 | 12/2004 | Zwilling et al. | |
| 2005/0251625 A1 | 11/2005 | Nagae et al. | |
| 2006/0117074 A1 | 6/2006 | Ezzat | |
| 2006/0174067 A1 * | 8/2006 | Soules et al. | 711/135 |
| 2007/0033356 A1 * | 2/2007 | Erlikhman | 711/162 |
| 2007/0143299 A1 * | 6/2007 | Huras et al. | 707/10 |

OTHER PUBLICATIONS

Ng, et al. "The Design and Verification of the Rio File Cache" (2001) IEEE Transactions on Computers vol. 50, No. 4, 16 pages.
USENIX. "Scalability and Failure Recovery in a Linux Cluster File System" (2000) Proceedings of the 4th Annual Linux Showcase and Conference, 13 pages.
Mohan, et al. "Repeating History Beyond ARIES" (1999) Proceedings of the 25th VLDB Conference, 17 pages.

* cited by examiner

*Primary Examiner*—Shane M Thomas
(74) *Attorney, Agent, or Firm*—Workman Nydegger (57) ABSTRACT

To ensure that logs representative of data changes are durably written, localized storage media cache is flushed to force a write to stable storage. Log sequence number tracking is leveraged to determine if log data in a localized storage media cache is likely to have not been written to durable storage. When this condition is likely, a FLUSH_CACHE command is issued to a storage media controller to force a durable write. This allows recovery of data changes to a transactional system even when its associated storage media does not provide write-ordering guarantees. Moreover, flushing of the storage media cache can be accomplished at a frequency that provides an upper bound on a maximum time between a transaction commit and data being made durable.

18 Claims, 10 Drawing Sheets

ENFORCED TRANSACTION SYSTEM RECOVERABILITY ON MEDIA WITHOUT WRITE-THROUGH

BACKGROUND

Most industry strength transaction processing systems, including databases, use ARIES (Algorithm for Recovery and Isolation Exploiting Semantics) for logging and recovery in order to guarantee ACID (Atomicity, Consistency, Isolation and Durability) properties of transactions and recover from crashes. ARIES supports partial rollbacks of transactions, fine-granularity (record-level) locking and recovery using write-ahead logging (WAL). The WAL protocol asserts that the log records representing changes to some data must already be on stable storage before the changed data is allowed to replace the previous version of that data on nonvolatile storage. That is, the system is not allowed to write an updated page to the nonvolatile storage version of the database until at least the undo portions of the log records which describe the updates to the page have been written to stable storage.

To enable the enforcement of this protocol, systems using the WAL method of recovery, typically store in every page a log sequence number (LSN) of the log record that describes the most recent update performed on that page. Before the page is written out, the system ensures that the log up to this LSN has been made durable. Most database systems use write-through write requests in order to guarantee that the log is synchronously written to stable storage before writing the data changes. SCSI drives that are predominantly used in enterprise server deployments of database systems, support write-through capability by means of the ForceUnitAccess (FUA) flag. ForceUnitAccess is, however, not supported by IDE drives. IDE drives have a controller cache where write requests are cached before they are written to the physical disk. In the absence of FUA, the write call returns to the user-mode process when the data still may be in the volatile disk controller cache and can potentially be lost in a crash.

The writes from the controller cache to the disk platter are not performed in the same order as the writes from the Operating System (OS) to the controller cache. As a result of the re-ordering, although, for example, a database system writes the log, waits for the write request to complete, before writing the data, the actual writes to the disk need not be in the same order. The log write from the database is cached in the controller cache and so is the data write. At a later point in time when the disk writes the data to the platter, it may very well write the data changes before the log writes.

If a system crash occurs and the data write has gone through, the log write can be lost in a crash. This results in violation of the WAL protocol. Violation of the WAL protocol can result in data inconsistency, loss of data and worse still loss of recoverability rendering the database unavailable. This problem is not limited to database systems alone. ARIES logging and recovery is used for other transactional systems, recoverable file systems, etc. The lack of write-through guarantees poses similar problems to these systems.

SUMMARY

Cache resident on storage media is flushed to ensure that log data representative of data changes is durably written to stable storage. This allows recovery of data changes to a transactional system such as, for example, a database system even though its associated storage media does not provide write-through guarantees. This technique does not add overhead in a path of a transaction. It can be utilized in systems without knowledge of whether the storage media provides write-through guarantees or not, ensuring data recoverability without requiring use of specific storage media. Thus, these techniques allow transactional systems to enforce recoverability with existing storage media such as, for example, desktop hard drive devices that typically do not ensure data durability. Additionally, flushing of the storage media cache can be accomplished at a frequency that provides an upper bound on a maximum time between a transaction commit and data being made durable.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Database systems use ARIES-like logging and recovery schemes to recover from failures and guarantee transactional consistency. ARIES relies on Write-Ahead Logging (WAL) protocol which requires that log records be durably written prior to the corresponding data changes. Desktop computing devices predominantly have IDE (Integrated Drive Electronics) drives with volatile controller caches and without write-through. They delay and reorder the writes thereby breaking the WAL assumption on which recovery is based. Instances are provided herein to enforce WAL by using a flush-cache command at a storage media controller level, without causing substantial overhead in the path of a transaction.

Durability (D in the ACID properties) of transactions can also be bounded utilizing instances provided herein. In order to guarantee durability of transactions, transactional systems typically issue a synchronous input/output (I/O) to flush the log for each transaction commit. This can achieve durability in cases of storage media that support write-through. However, on storage media that does not support write-through such as, for example, on IDE disks, the transaction may not be durable if the log records written during commit are lost during a crash while they are still in the volatile cache. Performant ways for providing an upper bound on the delay in transaction durability are also provided.

Figure 1:
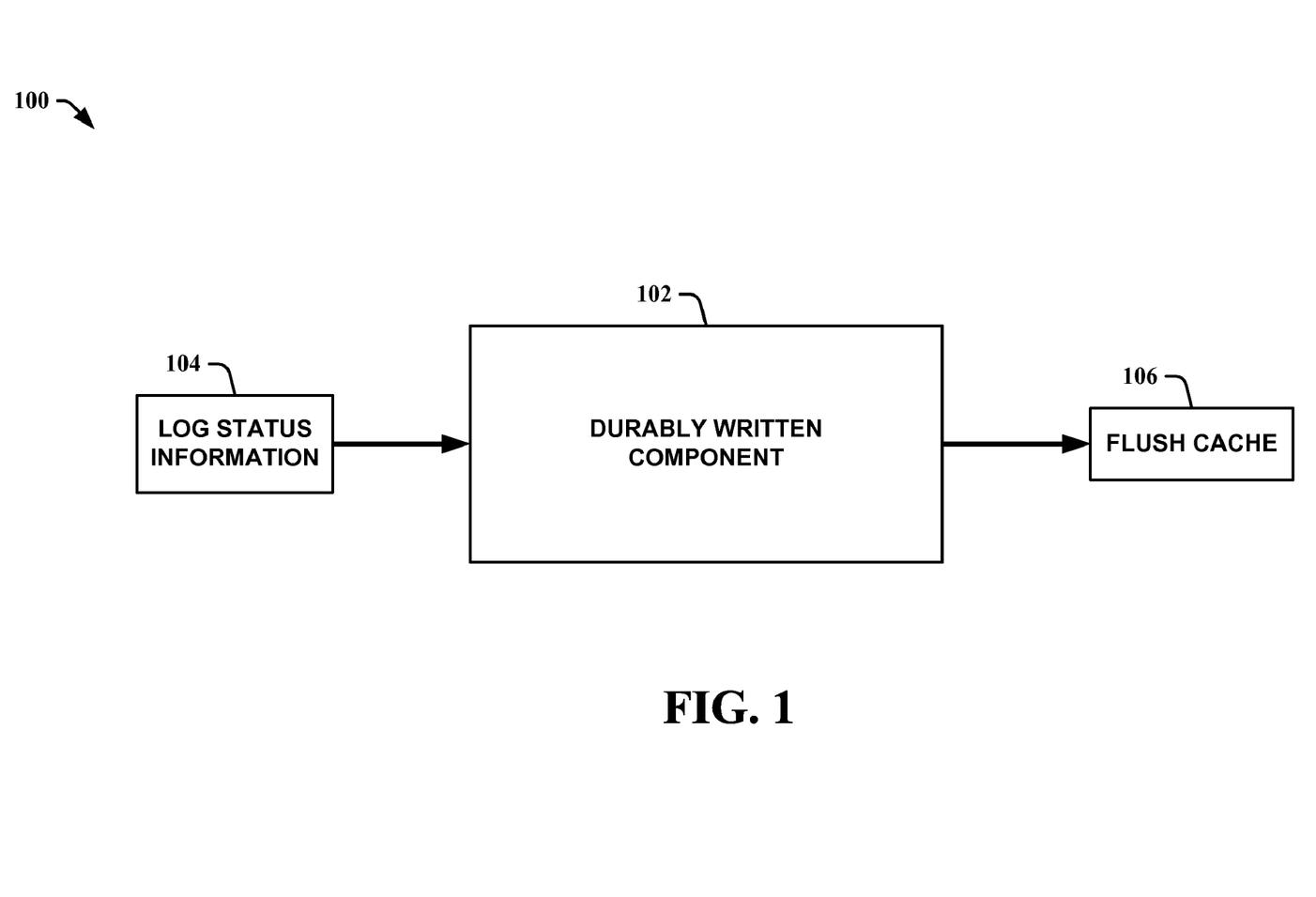
FIG. 1 is a block diagram of a data transaction recoverability enforcement system in accordance with an aspect of an embodiment.

FIG. 1 illustrates a data transaction recoverability enforcement system 100 that utilizes a durably written component 102 to obtain log status information 104 and command a flush cache 106 for storage media associated cache to ensure recoverability of data for a transaction system such as, for example, a database system and/or recoverable file systems and the like. The log status information 104 can include, but is not limited to, log sequence number information for current logs, written logs, and/or durably written logs and the like. The durably written component 104 monitors the various status' of the logs and determines when it is likely that log records have been written into storage media cache without being subsequently written to stable storage. This determination process is described in detail infra. If log records reside in storage media cache while data changes associated with those log records have already been written to stable storage, a crash can corrupt the data storage and subsequently applications that utilize this storage such as, for example, databases and the like.

Thus, when it is likely that log records have not yet been durably written to stable storage, the durably written component 102 issues a flush cache 106 to a storage media controller to force the storage media cache to be written to stable storage. This increases the stability of applications utilizing the stored data by enforcing recoverability on storage media that does not provide data write-through guarantees. Additionally, the durably written component 102 can also be utilized to flush caches periodically in order to provide an upper bound on a maximum time between a transaction commit and data being made durable (described infra). The data transaction recoverability enforcement system 100 is very useful with computing systems that incorporate non-SCSI storage devices such as, for example, typical desktop computing systems that utilize ATA or SATA hard drives. The instances provided herein allow applications such as, for example, database systems to run on these types of computing platforms and still enforce data recoverability despite the lack of data write-through guarantees.

Figure 2:
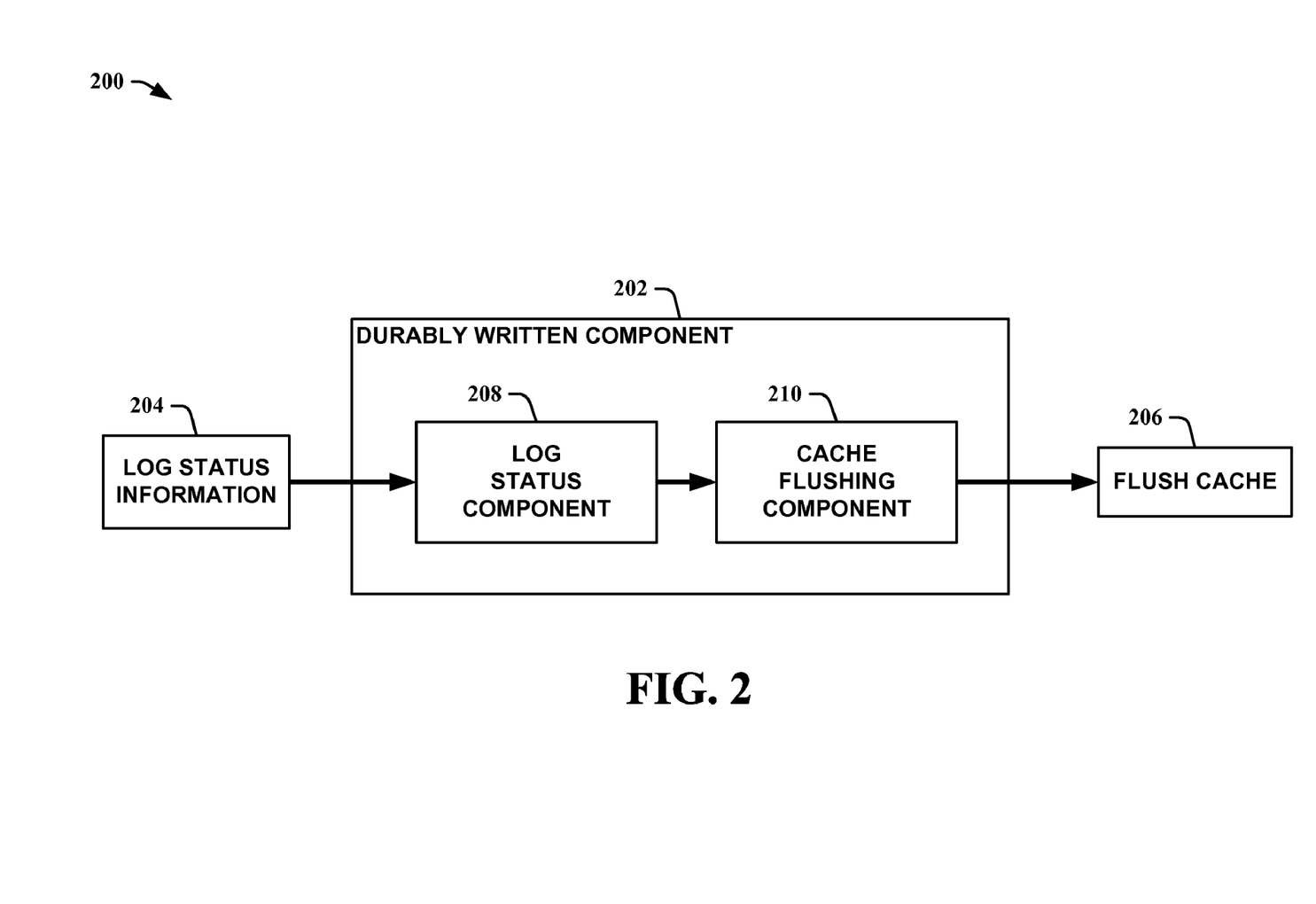
FIG. 2 is another block diagram of a data transaction recoverability enforcement system in accordance with an aspect of an embodiment.

Another data transaction recoverability enforcement system 200 utilizes a durably written component 202 that obtains log status information 204 and provides a flush cache 206 and is shown in FIG. 2. The durably written component 202 employs a log status component 208 and a cache flushing component 210. The log status component 208 monitors the log status information 204 and determines when a data transaction lacks a write-ordering guarantee. The cache flushing component 210 receives notification from the log status component 208 when the data transaction lacks the write-ordering guarantee and issues a flush cache 206 to force cache associated with storage media to be written to stable storage. In other instances, the cache flushing component 210 can also periodically issue the flush cache 206 to provide an upper bound on a delay in transaction durability.

Figure 3:
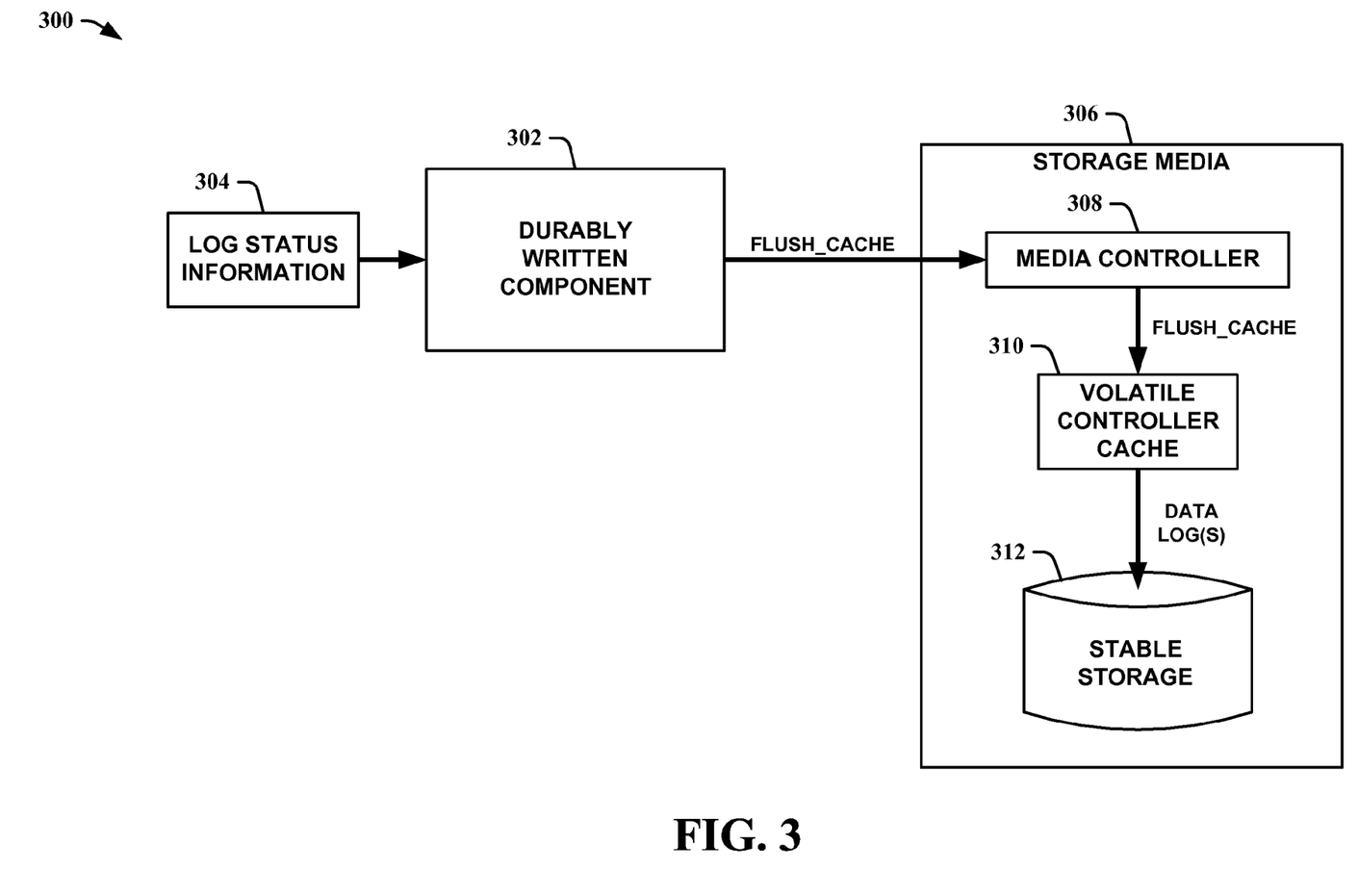
FIG. 3 is an illustration of a data transaction recoverability enforcement system interacting with storage media in accordance with an aspect of an embodiment.

An illustration of a data transaction recoverability enforcement system 300 interacting with storage media is shown in FIG. 3. The data transaction recoverability enforcement system 300 employs a durably written component 302 that obtains log status information 304 and provides a FLUSH_CACHE command to storage media 306 when appropriate. The storage media 306 typically employs a media controller 308 that utilizes volatile controller cache 310 to assist with read/write functions associated with stable storage 312. Some storage media do not immediately write data in the volatile controller cache 310 to stable storage 312 but instead wait for some criteria to be met such as an amount of cached data and/or a certain time period and the like. When log records are in the volatile controller cache 310, data corruption can occur in the event of a crash. By sending the FLUSH_CACHE command to the media controller 308, the durably written component 302 can force the storage media 306 to durably write the log records to the stable storage 312. This allows data recovery despite the storage media 306 not providing data write-through guarantees. In essence, desktop computing platforms can now emulate system reliabilities with regard to data recoverability like those found in server storage applications that employ write-through guarantee data storage devices.

Ordinarily, there is no support in an operating system to reliably detect if storage media supports write-through. However, most storage media such as, for example, single disk IDE drives support the FLUSH_CACHE command at the controller that flushes all the hardware caches between the host and the storage media. Even if the intent of the call is to flush dirty data for a given file, since the storage media controller is not aware of the logical association between the dirty blocks in the cache and those contained in a particular file; all the dirty blocks in the cache are written to the storage media. Since the FLUSH_CACHE command is expensive, the command is employed when it is required for write ordering guarantees and does not introduce overhead in the path of the transaction.

For example, a database system can employ a storage engine which has various managers—index manager, lock manager, buffer manager, transaction manager, log manager and recovery manager, etc. and uses, for example, the ARIES algorithm for logging and recovery. To read or update a row in a database system, a query processor module calls an index manager to find and optionally update the relevant row in a table. The index manager finds a page the row is present in and requests a buffer manager to retrieve the page for read or write access. The buffer manager retrieves the page from disk into the buffer pool if it is not already in the pool, latches the page in share or exclusive mode based on the intended access and returns the page. The index manager finds the required row in the page and acquires shared or exclusive lock on the row. If this is an update, the index manager generates a log record and applies the change to the page. If this is a read, the row is copied from the page into private memory. Then the page is unlatched.

When the transaction commits, the transaction manager generates a commit log record and requests the log manager to flush the contents of the log up to and including the commit log record to disk. Only after those log records are written to disk is the transaction declared committed and its locks released. The log manager and the buffer manager use log sequence numbers to keep track of changes to the pages. Log records in the log have monotonically increasing LSNs assigned to them. Whenever a log record is applied to a page, the log record's LSN is stored in the page. This is known as the pageLSN for the data page. When a dirty page is written out from the buffer pool to the disk, the buffer manager ensures that the log records up to the pageLSN have been made durable on the media before writing out the dirty page. This ensures that the write-ahead logging protocol is obeyed.

Enforcing Recoverability

Thus, a mechanism provided herein to guarantee write-ahead logging is to record the LSN of the last log record that updated a data page, making sure that all the log records up to that LSN have been flushed from the in-memory buffers to the stable storage. For the some instances provided herein, a log manager maintains several LSN values for a database to keep track of the progress of the log. These relevant values are described below.

FlushLSN: Each transactional system, for example a database, keeps track of a flush LSN which is a sequence number of a log record which is written to storage media and a server has received an input/output (I/O) completion confirmation for the same. Whenever an in-memory log buffer is written to a log file on stable storage, the FlushLSN is updated to the last log record written out. On disks that do not honor write-through, it is possible that all the logs up to the FlushLSN have not been made durable.

DurablyFlushedLSN: Instances herein can employ an additional LSN that is tracked for each transactional system (i.e., database, etc.). This LSN is denoted as the Durably-FlushedLSN. DurablyFlushedLSN is a sequence number of a log record that is known to have been certainly made durable on storage media. Consequently, the following relation holds for the LSNs for each transactional system: DurablyFlushedLSN≦FlushLSN≦CurrentLSN.

Durably written log: The above LSNs can be used to detect how much of a log is durably written. This can be used to decide if it is necessary to flush storage media cache such as, for example, a volatile disk controller cache. When a dirty page is written out to storage, the following applies. If a pageLSN is less than a DurablyFlushedLSN: then all records up to the pageLSN are already durable on the disk. No further action is necessary to make this durable. If a pageLSN is greater than a FlushLSN, then a log record is still in the in-memory log buffers which should be written to the storage media. However, if a pageLSN is greater than a Durably-FlushedLSN and less than a FlushLSN, a log record has been written to the disk and could potentially be still in the storage media cache. In this case, the storage media cache is flushed. Since flushing the storage media cache causes all the previous writes to be made durable, the DurablyFlushedLSN is set to the FlushLSN before the FLUSH_CACHE is issued. Although the DurablyFlushedLSN follows the FlushLSN, the FlushLSN can be updated more often than the former.

Checkpoint: Checkpoint is a mechanism to insure that transactional system changes have been written to storage media and bring the transactional system to a known good state at a given point in time. A checkpoint truncates an active log and crash recovery always begins with the last complete checkpoint. Write-ordering guarantees are necessary for successful crash recovery. The process can be accomplished as follows.

Write begin checkpoint log record: After writing the begin check point record, wait for the log to be flushed durably up to the current LSN. Most of the dirty data pages in the database would already have their corresponding log changes durable after the log has been made durable up to the current LSN.

Flush Buffer Pool Cache: All the dirty pages in the buffer pool are written to storage media. The log records up to pageLSN are made durable before the dirty data page is written out to the disk. With the log flush above, in the common case, additional durable log flushes are not necessary. After the dirty pages are written to the storage media, FLUSH_CACHE is called on all data files to make the data writes durable.

Write end checkpoint log record: After writing the end check point record, the system waits for the log to be flushed up to the end checkpoint LSN.

Write boot page with pointer to the begin checkpoint: It is necessary to make sure that the boot page points to the latest checkpoint. A FLUSH_CACHE is issued to make the changed boot page durable before the log truncation logic can truncate the active log.

Since a checkpoint operation is rare and is only triggered automatically after a sufficient database activity, adding an overhead of FLUSH_CACHE commands to the checkpoint logic does not significantly affect throughput since they are amortized over the entire workload.

Flush only when necessary: As described above; only if a buffer manager needs to ensure that a log up to a pageLSN is durable, is a FLUSH_CACHE commanded. During normal processing, especially on workloads that are typical on low-end client scenarios, paging out a dirty page is not a frequent operation. Although a FlushLSN is updated each time a transaction commits, the DurablyFlushedLSN is updated once for several updates to the FlushLSN (only when sufficient updates have been made to fill up a buffer pool requiring a page to be written out). Thus, the overhead of this scheme in the path of a transaction is substantially negligible.

End of Flushed Log: End of flushed log signifies the last LSN that is known to have been made durable. This is used by operations such as database backup and the like to determine the extent of a log backup. With the presence of storage media volatile controller caches, the durability of log records between the DurablyFlushedLSN and the FlushLSN is unknown. Consequently, the DurablyFlushedLSN is treated as the end of the flushed log.

Durability of transactions: With the presence of storage media volatile controller caches, the durability of transactions is not guaranteed in the event of a crash. However, instances provided herein can provide an upper bound on the delay in transaction durability. If a FLUSH_CACHE command is issued periodically with an appropriate frequency, an upper bound on the maximum time between a transaction commit and the data being made durable subsequently can be provided. Although this does not address the durability of transactions completely; the upper bound can be sufficient for many applications especially those that predominate on the low-end clients.

Testing

Predictable and repeatable simulation of crashes and the consequent corruptions is difficult. However, a storage media cache simulator in-proc with a transaction system can be utilized to test the functionality. For example, this can be tested via Microsoft's SQL server by utilizing the Transacted-SQL interface. Thus, interface commands can be employed to turn a storage media cache simulator on and off during automated tests.

Initialization: The storage media cache simulator uses, for example, an in-proc 8 MB (based on typical cache controller sizes) buffer. This buffer is not allocated by default. Before the tests start, the tests initialize the storage media cache simulator. The initialization routine initializes the 8 MB buffer used to store the cached storage media writes. It also initializes the cache descriptor data structures for each cache line. This initialize procedure in itself does not start caching of the storage media writes. The following section outlines the mechanism to start caching of storage media writes.

Enable caching of log writes and data writes: In order to simulate the various write ordering violations that can result in a server in the presence of the storage media cache; options are provided to turn on write-caching for specific writes. Based on the scenario in a test case, the appropriate writes can be cached. The following options can be utilized for choosing specific writes.

DISK_CACHE_SIMULATOR_CACHE_
   LOG_WRITES: This option is used to cache log writes. This turns on caching of log writes for all transaction systems attached to the instance of the server.
DISK_CACHE_SIMULATOR_CACHE_BOO-
   T_PAGE_WRITES: This option is used to cache the boot page of the transaction system (first page of the primary transaction system files). This turns on the caching of the boot page for all the transaction systems attached to the server. This facilitates the simulation of various check point related scenarios.
DISK_CACHE_SIMULATOR_CACHE_DATA_
   WRITES: This trace flag is used to cache data page writes (this affects all the data pages except the boot page). This turns on caching of data writes for all transaction systems attached to the instance of the server.

Intercepting I/Os from the transaction system The storage media cache simulator intercepts write I/Os from the storage transaction system and caches them in the in-proc cache. Read I/Os have to be intercepted so that if the storage media cache contains more recent data for a read request, then the read request is fulfilled from the cache. In addition to the read and write I/O requests, the FlushFileBuffers command is also intercepted and the entire in-proc cache is flushed to simulate the behavior of a FLUSH_CACHE command on the storage media volatile controller cache.

Flushing the disk volatile controller cache: The simulator cache is flushed either on an explicit request made through the test infrastructure or in response to an intercepted FlushFileBuffers call issued from the transaction system.

In view of the exemplary systems shown and described above, methodologies that may be implemented in accordance with the embodiments will be better appreciated with reference to the flow charts of FIGS. 4-8. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 4:
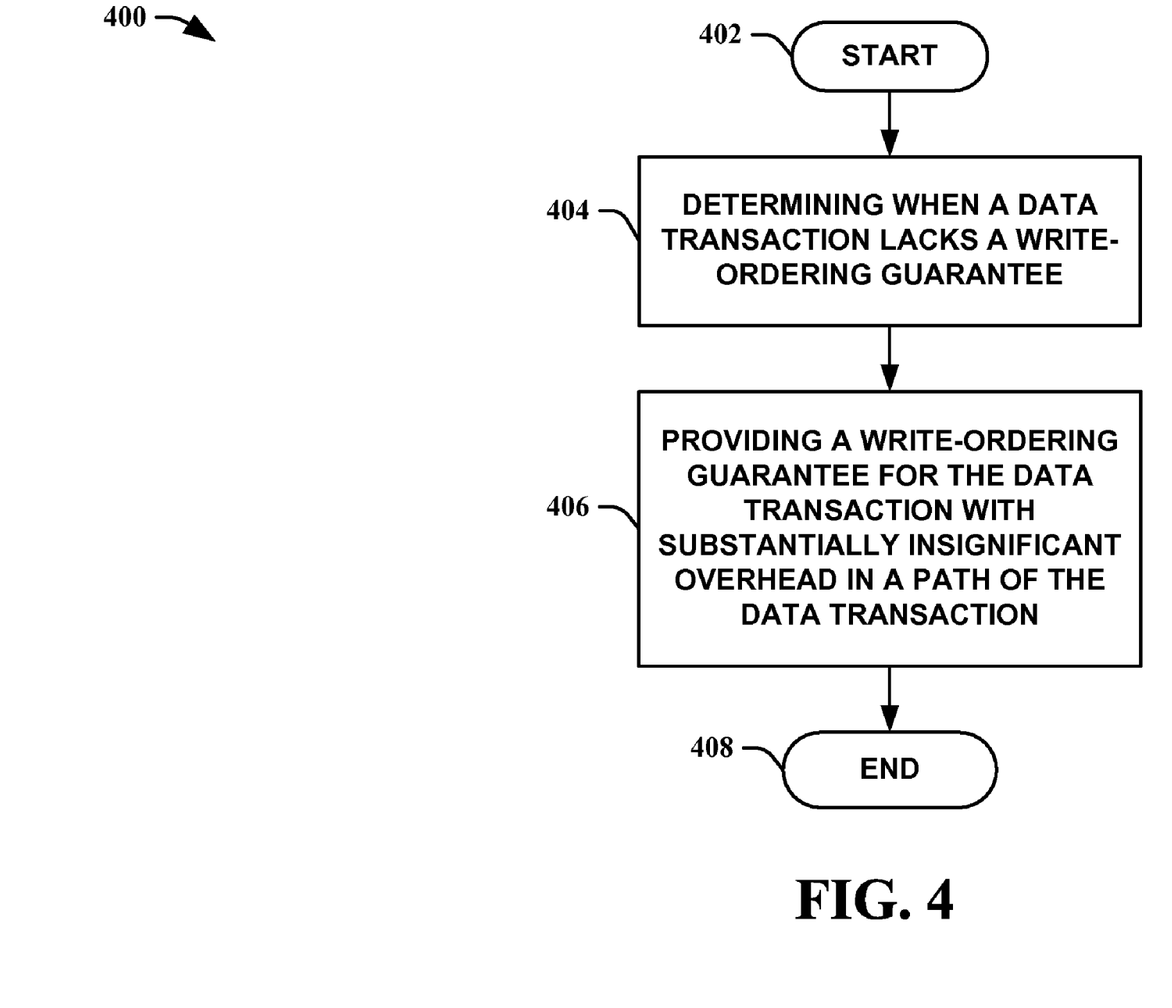
FIG. 4 is a flow diagram of a method of enforcing data transaction recoverability in accordance with an aspect of an embodiment.

In FIG. 4, a flow diagram of a method 400 of enforcing data transaction recoverability in accordance with an aspect of an embodiment is shown. The method 400 starts 402 by determining when a data transaction lacks a write-ordering guarantee 404. This can be accomplished, for example, by monitoring which logs have been written and which logs have been durably written. Oftentimes, the two types of logs do not match as a cache for storage media can hold several log writes before moving the logs to permanent storage. A write-ordering guarantee is then provided for the data transaction with substantially insignificant overhead in a path of the data transaction 406, ending the flow 408. One process for accomplishing this is to leverage an existing supported command such as, for example, FLUSH_CACHE. This command can be utilized to force storage media to write logs from the cache to stable storage when logs are written but not durably written.

Figure 5:
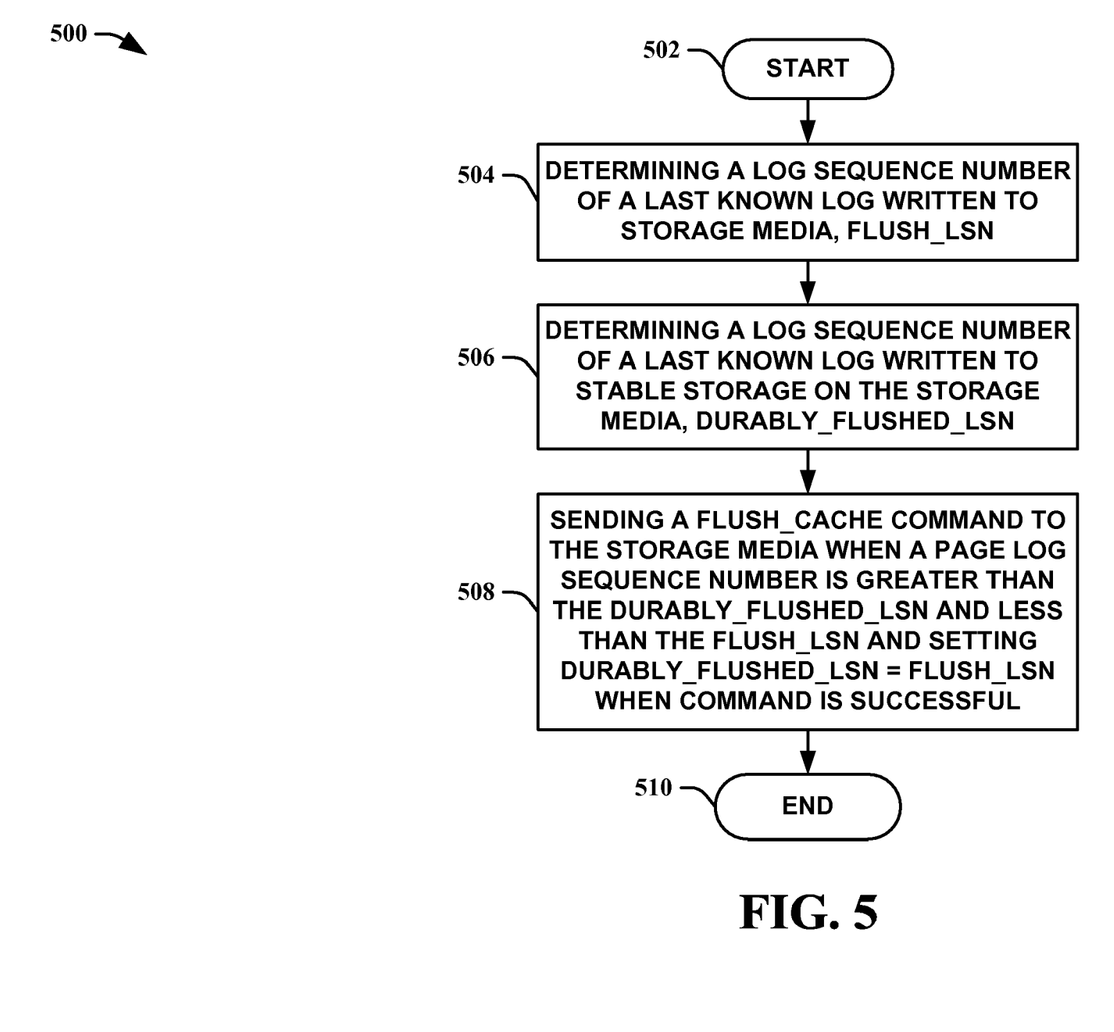
FIG. 5 is a flow diagram of a method of enforcing data transaction recoverability by employing durably written logs in accordance with an aspect of an embodiment.

Turning to FIG. 5, a flow diagram of a method 500 of enforcing data transaction recoverability by employing durably written logs in accordance with an aspect of an embodiment is depicted. The method 500 starts 502 by determining a log sequence number of a last known log written to storage media, FLUSH_LSN 504. Log sequence numbers generally increase to indicate sequentially when logs occurred. Writes to storage media with volatile caches are not required to be immediately written to stable storage and, thus, these types of log writes can reside for a time on storage media cache. A log sequence number of a last known log written to stable storage on the storage media, DURABLY_FLUSHED_LSN, is then determined 506. The log sequence number of logs written to stable storage is tracked to determine which logs have been moved from storage media cache to stable storage. A FLUSH_CACHE command is sent to the storage media when a page log sequence number is greater than the DURABLY_FLUSHED_LSN and less than the FLUSH_LSN 508 and DURABLY_FLUSHED_LSN is set equal to FLUSH_LSN when the command is successful, ending the flow 510. When a current log sequence number indicates that the log still resides on storage media cache, a cache flush command is sent to the storage media (storage media controller) to force the storage media to write the cache contents to stable storage and, thus, durably write the logs.

Figure 6:
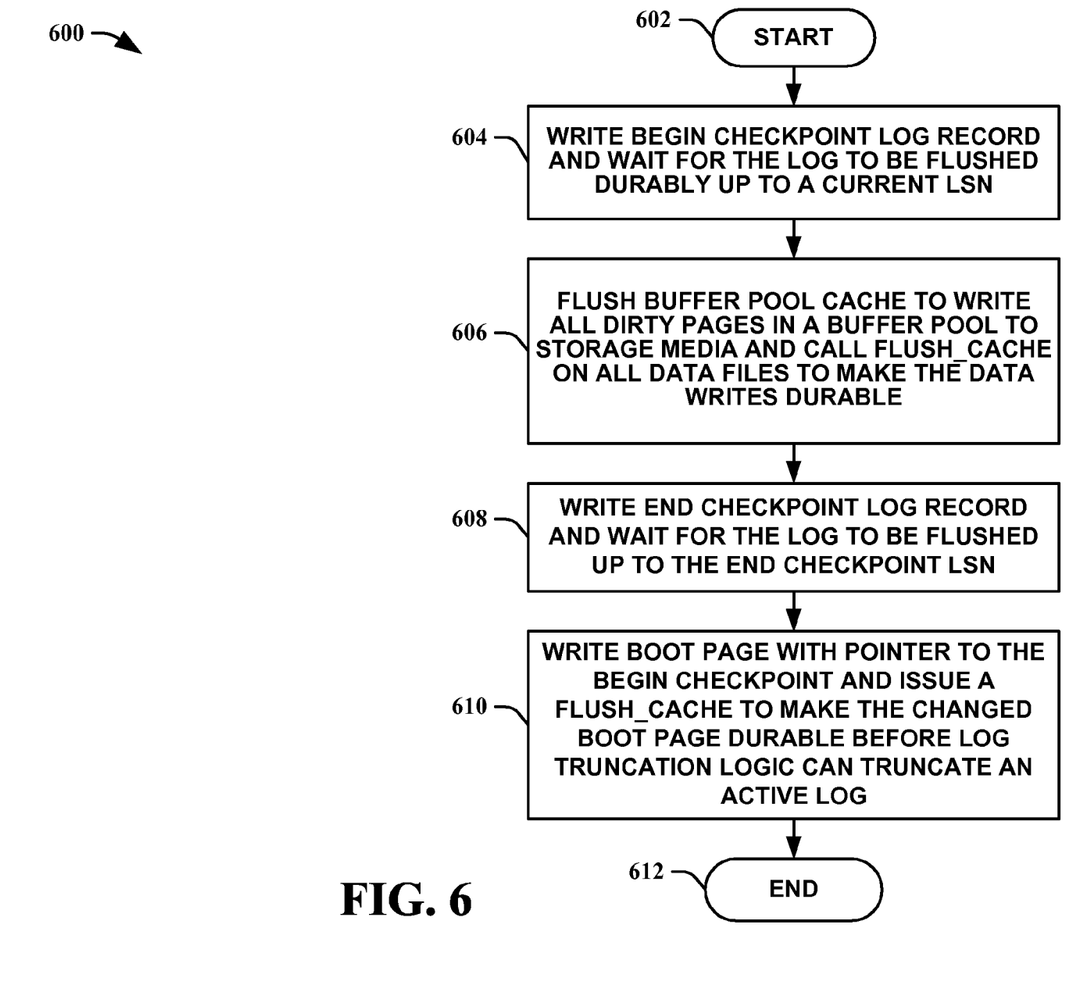
FIG. 6 is a flow diagram of a method of enforcing data transaction recoverability by employing a checkpoint mechanism in accordance with an aspect of an embodiment.

Looking at FIG. 6, a flow diagram of a method 600 of enforcing data transaction recoverability by employing a checkpoint mechanism in accordance with an aspect of an embodiment is illustrated. A checkpoint functions to ensure that data changes have been properly written to stable storage to enable a known good state for data on the storage media at a given point in time. Flushing storage media associated cache can also be utilized by the checkpoint to facilitate this process. The method 600 starts 602 by writing a begin checkpoint log record and waiting for the log to be flushed durably up to a current LSN 604. Most dirty data pages in, for example, a database already have their corresponding log changes durable after the log is made durable up to a current LSN.

Buffer Pool Cache is then flushed to write all dirty pages in a buffer pool to storage media and FLUSH_CACHE is then called on all data files to make the data writes durable 606. This ensures that log records up to a pageLSN are made durable before dirty data pages are written to storage media. In typical cases, additional durable log flushes are not required. An end checkpoint log record is then written and waiting ensues until the log is durably flushed up to the end checkpoint LSN 608. A boot page with pointer is written to the begin checkpoint and a FLUSH_CACHE is issued to make the changed boot page durable before log truncation logic can truncate an active log 610, ending the flow 612. It is necessary to make sure that the boot page points to the latest checkpoint.

Figure 7:
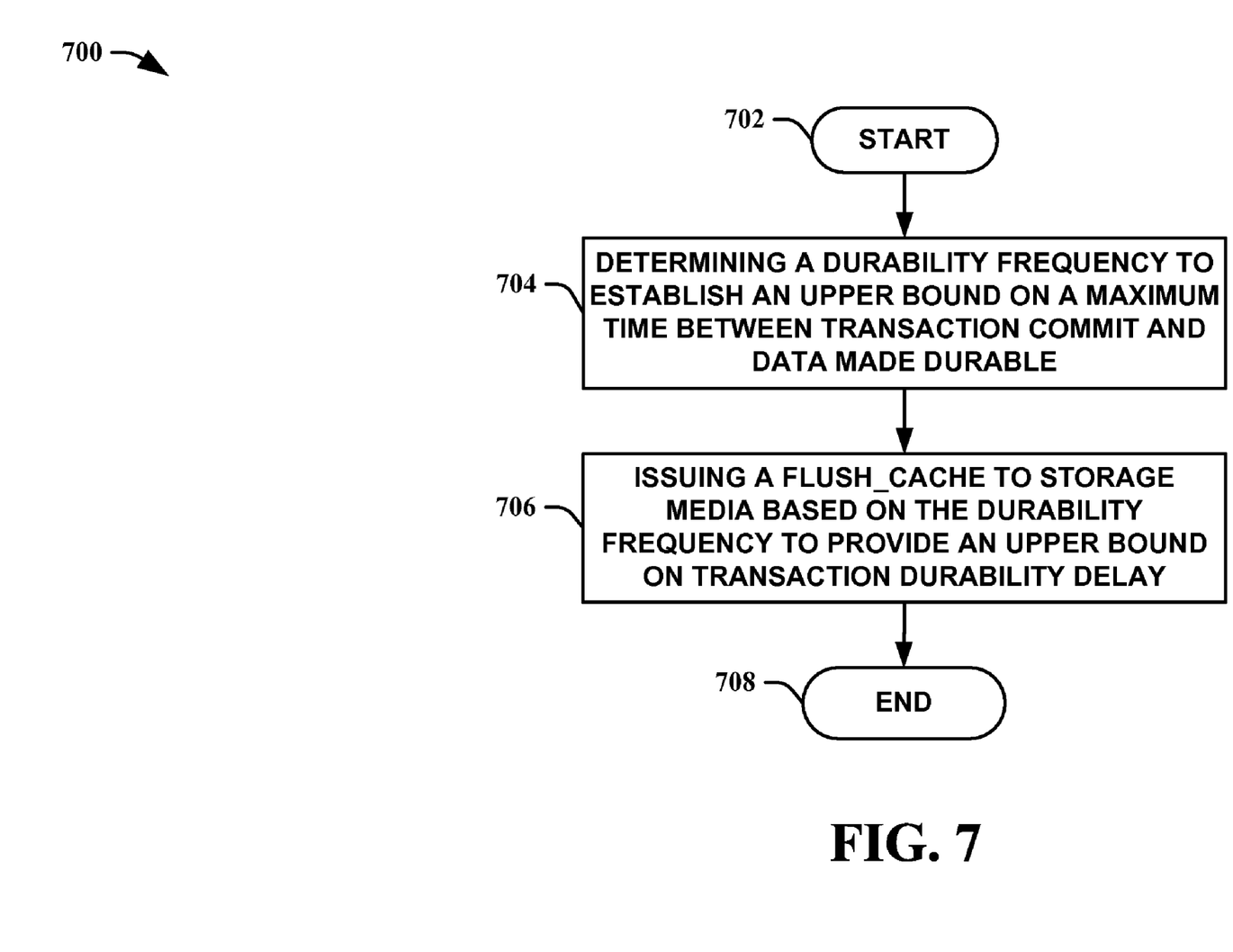
FIG. 7 is a flow diagram of a method of providing an upper bound on transaction durability delay in accordance with an aspect of an embodiment.

Referring to FIG. 7, a flow diagram of a method 700 of providing an upper bound on transaction durability delay in accordance with an aspect of an embodiment is shown. The method 700 starts 702 by determining a durability frequency to establish an upper bound on a maximum time between transaction commit and data made durable 704. For example, a period of approximately 30 seconds can be utilized to determine the durability frequency. A FLUSH_CACHE is issued to storage media based on the durability frequency to provide an upper bound on transaction durability delay 706, ending the flow 708. With the presence of storage media volatile controller caches, the durability of transactions is not guaranteed in the event of a crash. However, instances provided herein can provide an upper bound on the delay in transaction durability. If a FLUSH_CACHE command is issued periodically with an appropriate frequency, an upper bound on the maximum time between a transaction commit and the data being made durable subsequently can be provided.

Figure 8:
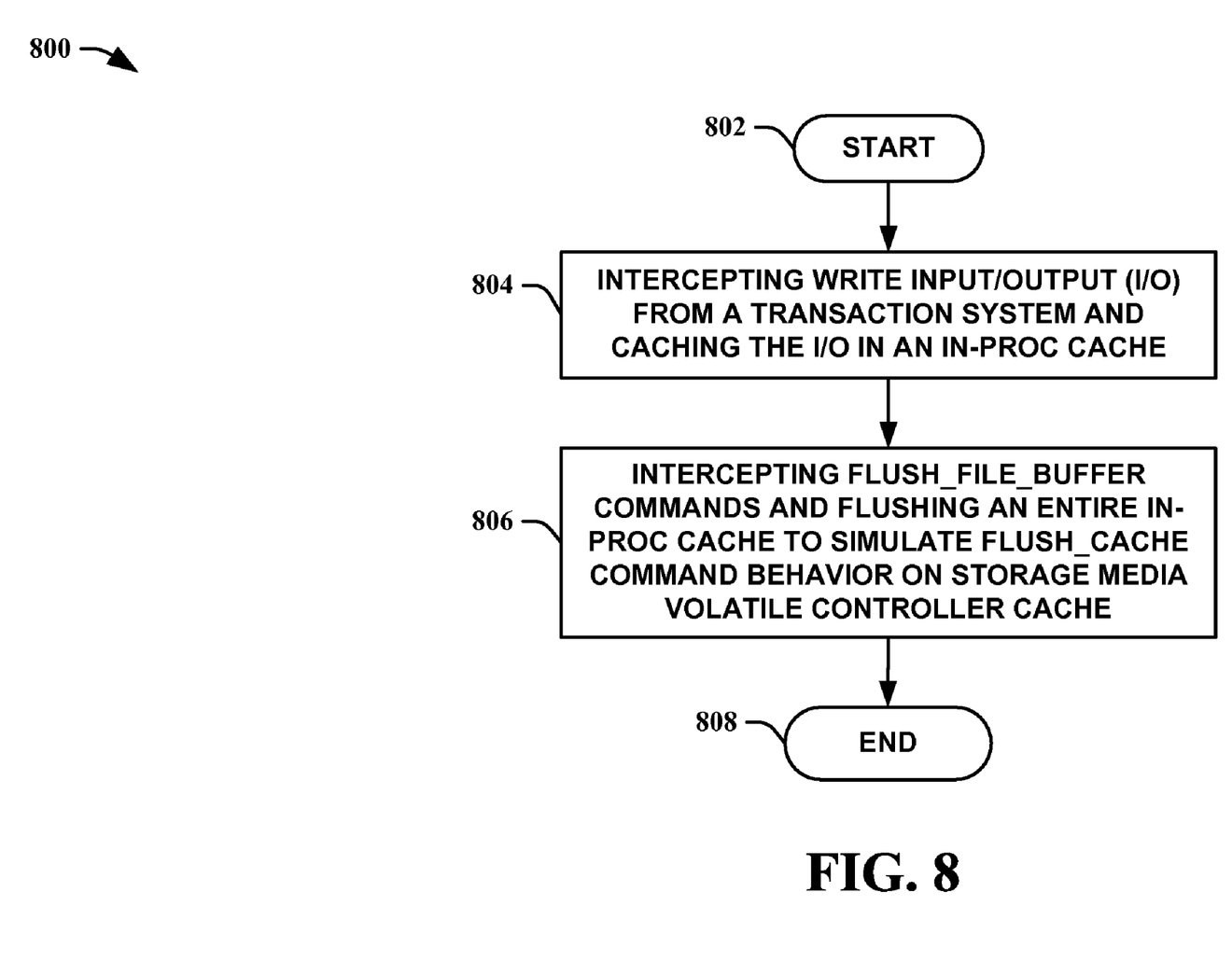
FIG. 8 is a flow diagram of a method of testing FLUSH_CACHE commands using in-proc cache in accordance with an aspect of an embodiment.

In FIG. 8, a flow diagram of a method 800 of testing FLUSH_CACHE commands using in-proc cache in accordance with an aspect of an embodiment is depicted. The method 800 starts 802 by intercepting write input/output (I/O) from a transaction system and caching the I/O in an in-proc cache 804. Intercepting FLUSH_FILE_BUFFER commands are then intercepted and an entire in-proc cache is flushed to simulate FLUSH_CACHE command behavior on storage media volatile controller cache 806, ending the flow 808. Predictable and repeatable simulation of crashes and the consequent corruptions is difficult. However, a storage media cache simulator in-proc with a server can be utilized to test the performance.

Figure 9:
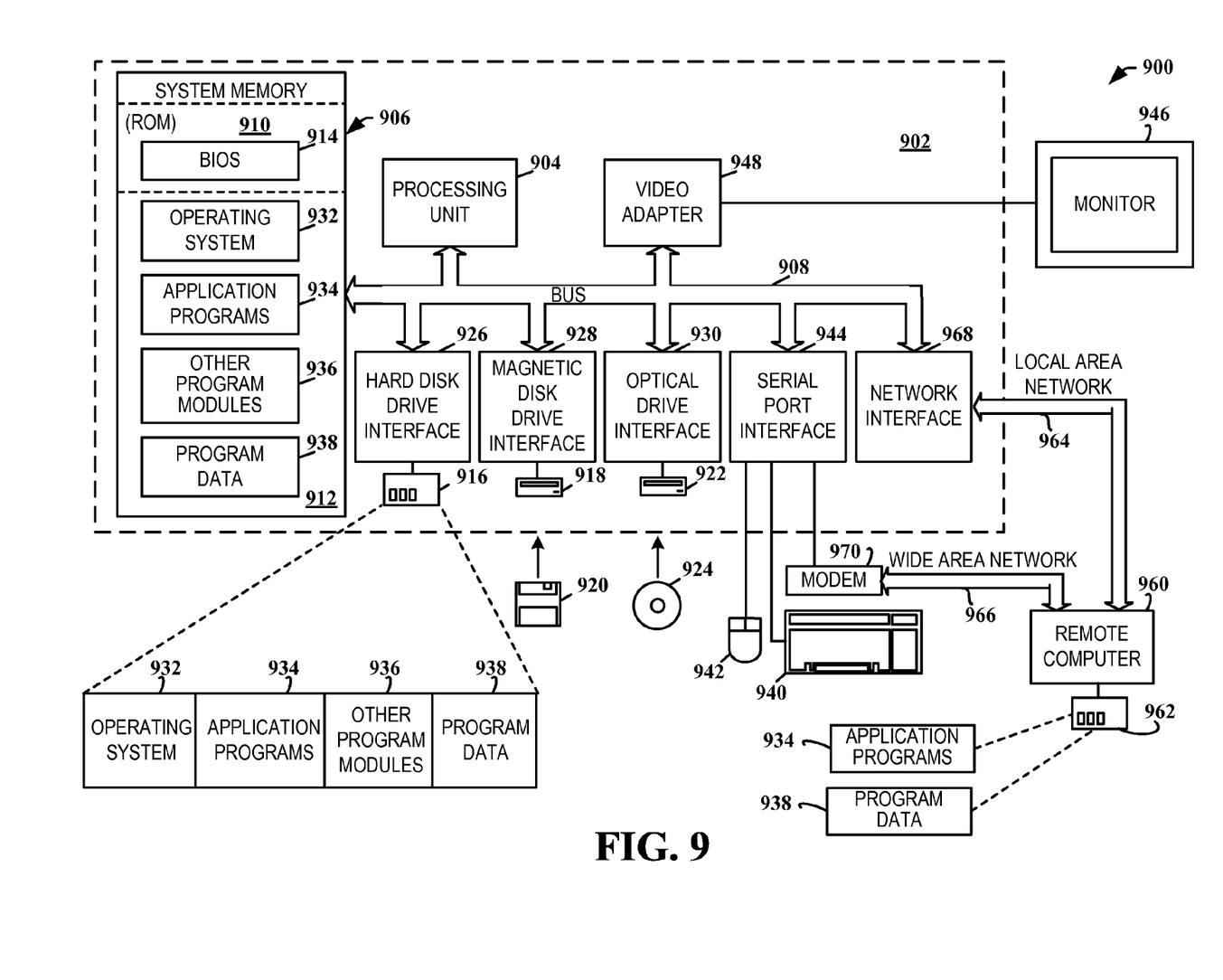
FIG. 9 illustrates an example operating environment in which an embodiment can function.

In order to provide additional context for implementing various aspects of the embodiments, FIG. 9 and the following discussion is intended to provide a brief, general description of a suitable computing environment 900 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on standalone computers. In a distributed computing environment, program modules can be located in local and/or remote memory storage devices.

With reference to FIG. 9, an exemplary system environment 900 for performing the various aspects of the embodiments include a conventional computer 902, including a processing unit 904, a system memory 906, and a system bus 908 that couples various system components, including the system memory, to the processing unit 904. The processing unit 904 can be any commercially available or proprietary processor. In addition, the processing unit can be implemented as multi-processor formed of more than one processor, such as can be connected in parallel.

The system bus 908 can be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also can include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 900, and further that any such media can contain computer-executable instructions for performing the methods of the embodiments.

A number of program modules can be stored in the drives 916-922 and RAM 912, including an operating system 932, one or more application programs 934, other program modules 936, and program data 938. The operating system 932 can be any suitable operating system or combination of operating systems. By way of example, the application programs 934 and program modules 936 can include a storage media recoverability enforcement scheme in accordance with an aspect of an embodiment.

A user can enter commands and information into the computer 902 through one or more user input devices, such as a keyboard 940 and a pointing device (e.g., a mouse 942). Other input devices (not shown) can include a microphone, a joystick, a game pad, a satellite dish, a wireless remote, a scanner, or the like. These and other input devices are often connected to the processing unit 904 through a serial port interface 944 that is coupled to the system bus 908, but can be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 can include other peripheral output devices (not shown), such as speakers, printers, etc.

It is to be appreciated that the computer 902 can operate in a networked environment using logical connections to one or more remote computers 960. The remote computer 960 can be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g. wired or wireless) of establishing a communications link between the computers 902 and 960 can be used when carrying out an aspect of an embodiment.

In accordance with the practices of persons skilled in the art of computer programming, the embodiments have been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
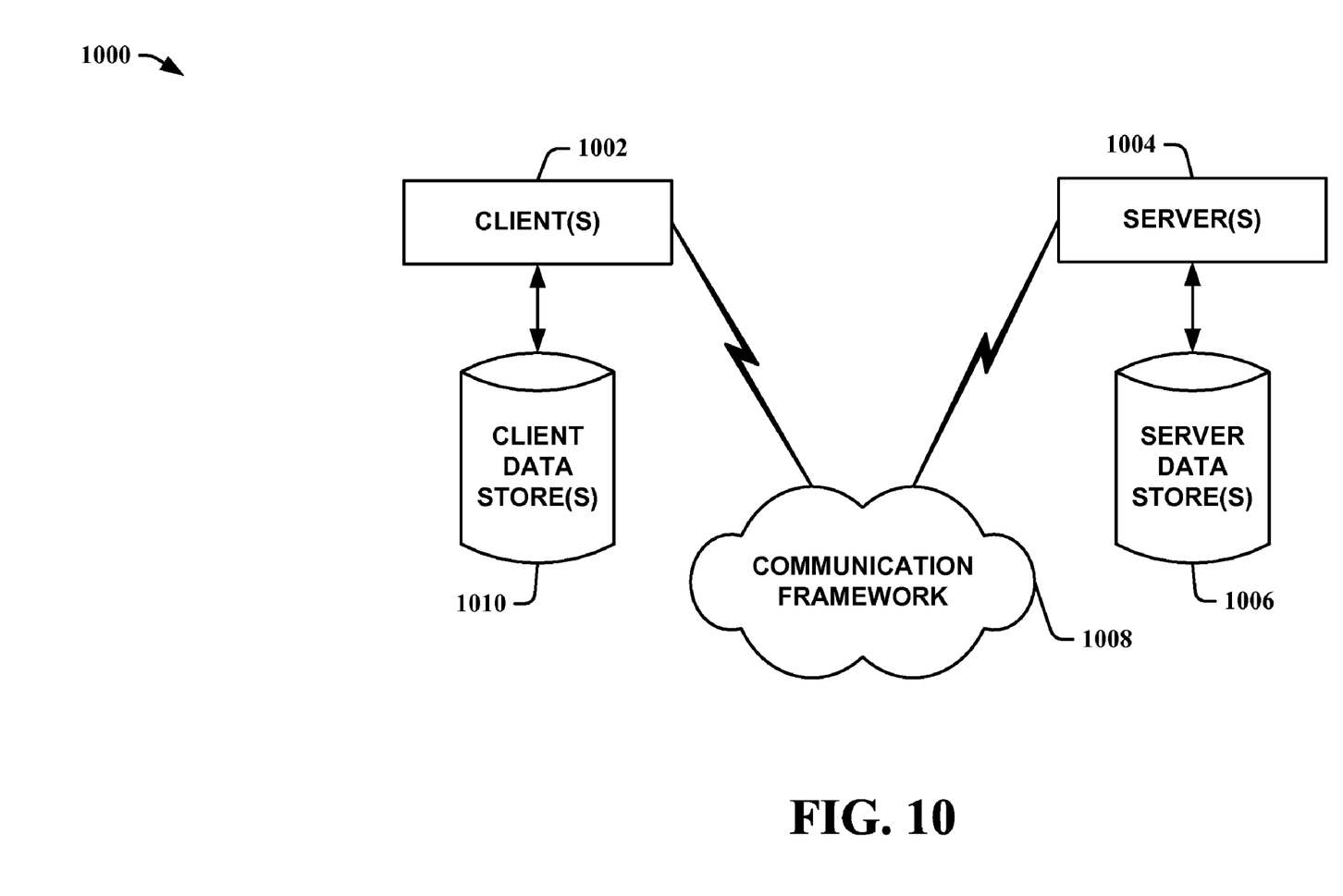
FIG. 10 illustrates another example operating environment in which an embodiment can function.

FIG. 10 is another block diagram of a sample computing environment 1000 with which embodiments can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in a storage media recoverability enforcement facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system, the computer system comprising:
  system memory;
  one or more processors;
  a storage device, the storage device including a media controller, a controller cache, and durable storage, the media controller configured with cache behavior that writes data from the controller cache to the durable storage when values for specified criteria are satisfied;
  one or more other computer-readable media having stored thereon computer-executable instructions representing a log status component and a cache flushing component, the log status component configured to:
    monitor log records written during transaction commits; and
    determines when a transaction lacks a write-ordering guarantee based on values for the specified criteria when a log record for the transaction is written; and
  wherein the cache flushing component is configured to:
    send a flush command to the media controller to override the cache behavior of the media controller and force the storage device to durably write a log record, the flush command expressly instructing the media controller to flush any data cached in the controller cache to the durable storage in response to the log status component determining that a transaction lacks a write-ordering guarantee.

2. The system of claim 1, wherein the log status component being configured to monitor log records comprises the log status component being configured to utilize log sequence numbers (LSNs) that track which log records have been stored in controller cache and which log records have been flushed from controller cache to durable storage to determine when a data transaction lacks a write-ordering guarantee.

3. The system of claim 1, the cache flushing component flushes the storage media associated cache at a periodic interval to provide an upper bound on a maximum time between a transaction commit and when data is made durable.

4. The system of claim 3, the periodic interval comprising approximately a 30 second interval.

5. A database system utilizing the system of claim 1 to enforce database recoverability on storage media that lacks a write-ordering guarantee.

6. The system of claim 1, the storage media comprising Advanced Technology Attachment (ATA) and/or Serial Advanced Technology Attachment (SATA) hard drives.

7. The method of claim 1 wherein determining that the transaction lacks a write-ordering guarantee comprises:
   determining a log sequence number (LSN) of a last known log written to storage media;
   determining a log sequence number (LSN) of a last known log written to stable storage on the storage media; and
   determining that a page log sequence number (LSN) is greater than the last known stable log LSN and less than the last known written log LSN and setting a value of the last known stable log LSN equal to the last known written log LSN.

8. The method of claim 1 further comprising:
   writing a begin checkpoint log record and waiting for the checkpoint log record to be flushed durably up to a current log sequence number (LSN);
   writing dirty pages in a buffer pool to durable storage and flushing the controller cache to make the writes durable;
   writing an end checkpoint log record and waiting for the end checkpoint log record to be flushed up to an end checkpoint log sequence number (LSN); and
   writing a boot page with pointer to the begin checkpoint log record and flushing the controller cache to make the changed boot page durable before log truncation logic can truncate an active log record.

9. The method of claim 1 wherein providing a write ordering guarantee comprises:
   intercepting write input/output (I/O) from a transaction system and caching the I/O in an in-proc cache; and
   intercepting flush file buffer commands and flushing an entire in-proc cache to simulate a flush cache command behavior on the controller cache.

10. The system as recited in claim 1, wherein the storage device is an Integrated Drive Electronics (IDE) storage device.

11. The system as recited in claim 1, wherein the cache behavior of the storage device does not support ForceUnitAccess.

12. At a computer system, the computer system including system memory, one or more processors, and a storage device, the storage device including a media controller, a controller cache, and durable storage, the media controller configured with cache behavior that writes data from the controller cache to the durable storage when values for specified criteria are satisfied, a method for enforcing data transaction recoverability, comprising:
   monitoring a log record written during a transaction commit;
   determining that the transaction lacks a write-ordering guarantee based on values for the specified criteria when the log record for the transaction is written; and
   providing a write ordering guarantee for the transaction by sending a flush command to the media controller to override the cache behavior of the media controller and force the storage device to durably write the log record, the flush command expressly instructing the media controller to flush any data cached in the controller cache to the durable storage in response to determining that the transaction lacks a write-ordering guarantee.

13. The method of claim 7 further comprising:
   providing an upper bound on a delay in transaction durability.

14. The method of claim 13 further comprising:
   determining a durability frequency to establish an upper bound on a maximum time between transaction commit and data made durable; and
   flushing the controller cache based on the durability frequency to provide an upper bound on transaction durability delay.

15. The method of claim 14, the durability frequency is based on a periodic interval of approximately 30 seconds.

16. A database system employing the method of claim 7 to ensure database recoverability.

17. A computer program product for use at a computer system, the computer system including system memory, one or more processors, and a storage device, the storage device including a media controller, a controller cache, and durable storage, the media controller configured with cache behavior that writes data from the controller cache to the durable storage when values for specified criteria are satisfied, the computer program product for implementing a method for enforcing data transaction recoverability, the computer program product comprising one or more computer storage media having stored thereon computer-executable instructions, that when executed at a processor, cause the computer system to perform the method, including the following:
   monitor a log record written during a transaction commit;
   determine that the transaction lacks a write-ordering guarantee based on values for the specified criteria when the log record for the transaction is written; and
   provide a write ordering guarantee for the data transaction by sending a flush command to the media controller to override the cache behavior of the media controller and force the storage device to durably write a log record, the flush command expressing instructing the media controller to flush any data cached in the controller cache to the durable storage in response to determining that the transaction lacks a write-ordering guarantee.

18. The system as recited in claim 1, wherein specified criteria include one or more of a specified amount of data being cached in the controller cache and an occurrence of a recurring timer period.

* * * * *